Oct. 22, 1929. G. C. CHASE Re. 17,466

MULTIPLIER MECHANISM FOR CALCULATING MACHINES

Original Filed March 15, 1926 15 Sheets-Sheet 1

Inventor

Geo. C. Chase.

By E. W. Anderson & Son.

Attorney

Oct. 22, 1929. G. C. CHASE Re. 17,466

MULTIPLIER MECHANISM FOR CALCULATING MACHINES

15 Sheets-Sheet 2

Original Filed March 15, 1926

Inventor

Geo. C. Chase

By E. W. Anderson Jr.

Attorney

G. C. CHASE

Oct. 22, 1929. MULTIPLIER MECHANISM FOR CALCULATING MACHINES Re. 17,466

15 Sheets-Sheet 3

Original Filed March 15, 1926

Inventor

Geo G. Chase.

By E. W. Anderson Son

Attorney

Oct. 22, 1929. G. C. CHASE Re. 17,466

MULTIPLIER MECHANISM FOR CALCULATING MACHINES

15 Sheets-Sheet 4

Original Filed March 15, 1926

Inventor

Geo. C. Chase

E. W. Anderson & Son

By

Attorney

G. C. CHASE

Oct. 22, 1929. MULTIPLIER MECHANISM FOR CALCULATING MACHINES Re. 17,466

15 Sheets-Sheet 5

Original Filed March 15, 1926

Inventor
Geo. C. Chase
E. W. Anderson & Son.
By
Attorney

G. C. CHASE

Oct. 22, 1929. MULTIPLIER MECHANISM FOR CALCULATING MACHINES Re. 17,466

15 Sheets-Sheet 6

Original Filed March 15, 1926

Inventor

Geo. C. Chase

By E. W. Anderson Jr.

Attorney

G. C. CHASE

Oct. 22, 1929. MULTIPLIER MECHANISM FOR CALCULATING MACHINES Re. 17,466

15 Sheets-Sheet 7

Original Filed March 15, 1926

Inventor

Geo. C. Chase.

By E. W. Anderson Jr.

Attorney

G. C. CHASE

Oct. 22, 1929. MULTIPLIER MECHANISM FOR CALCULATING MACHINES Re. 17,466

15 Sheets-Sheet 8

Original Filed March 15, 1926

Inventor
Geo. C. Chase
E. W. Anderson Son
By
Attorney

G. C. CHASE
Oct. 22, 1929. MULTIPLIER MECHANISM FOR CALCULATING MACHINES Re. 17,466
15 Sheets-Sheet 9
Original Filed March 15, 1926
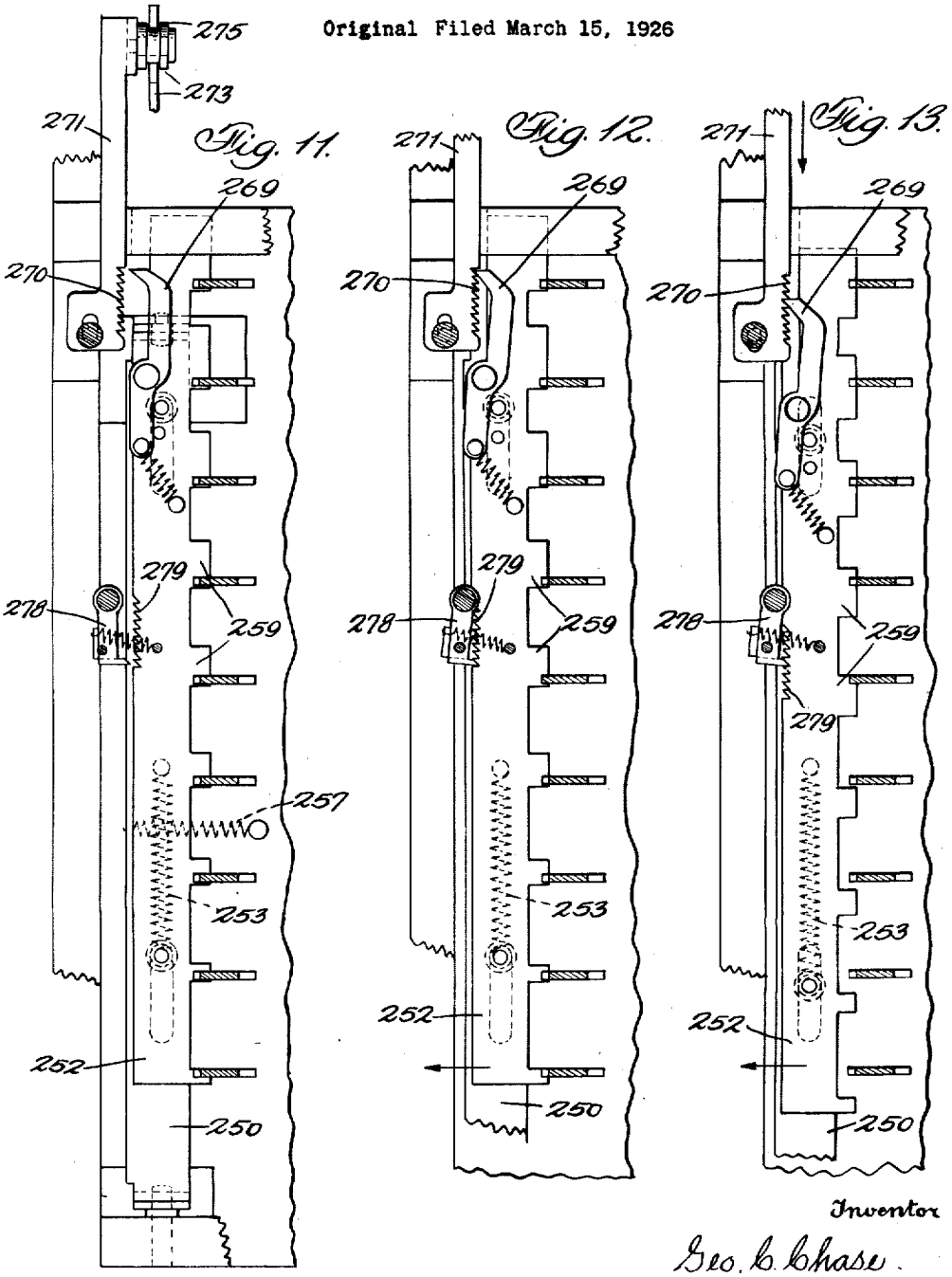
Inventor
Geo. C. Chase.
By E. W. Anderson Jr.
Attorney G. C. CHASE
Oct. 22, 1929. MULTIPLIER MECHANISM FOR CALCULATING MACHINES Re. 17,466
15 Sheets-Sheet 10
Original Filed March 15, 1926
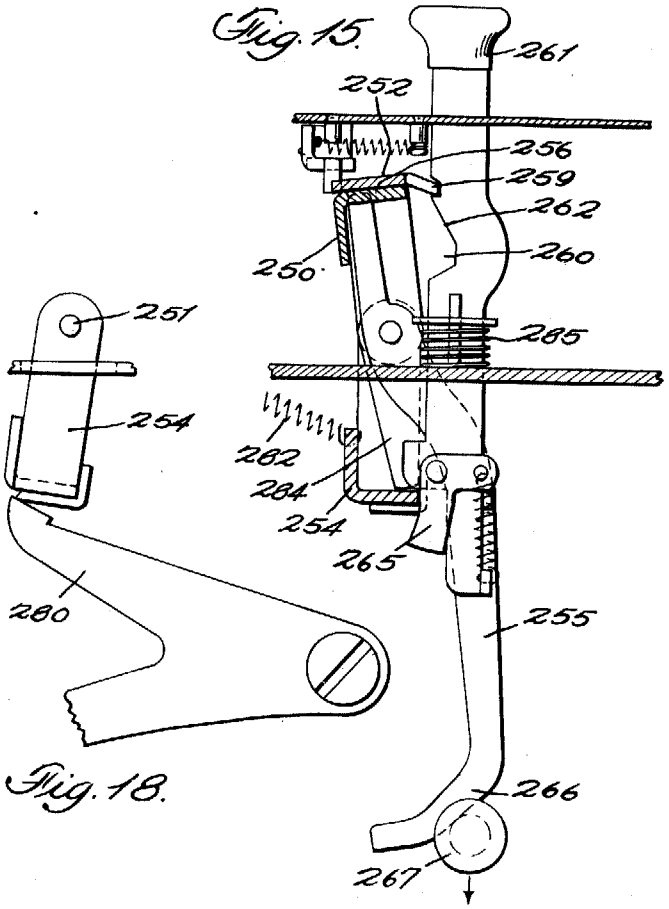
Fig. 15.
Fig. 18.
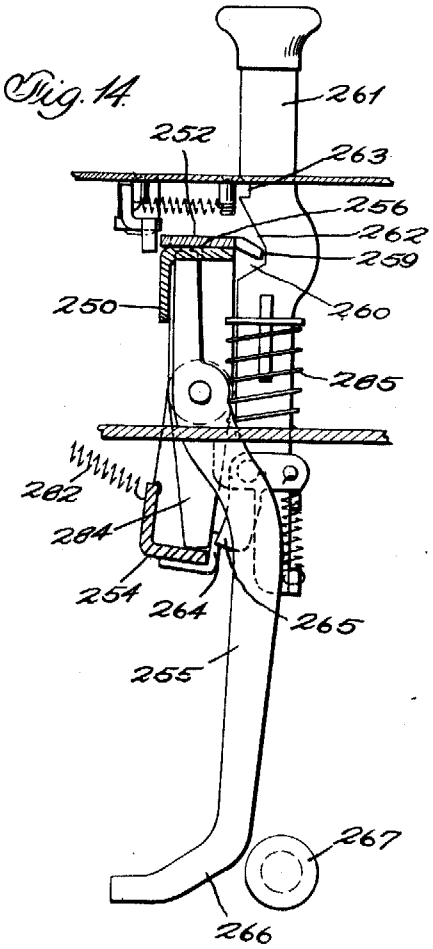
Fig. 14.
Inventor
Geo. C. Chase.
By E. W. Anderson & Son.
Attorney

G. C. CHASE

Oct. 22, 1929. MULTIPLIER MECHANISM FOR CALCULATING MACHINES Re. 17,466

15 Sheets-Sheet 11

Original Filed March 15, 1926

Inventor

Geo. C. Chase

By E. W. Anderson & Son

Attorney

G. C. CHASE
Oct. 22, 1929. MULTIPLIER MECHANISM FOR CALCULATING MACHINES Re. 17,466
15 Sheets-Sheet 12
Original Filed March 15, 1926
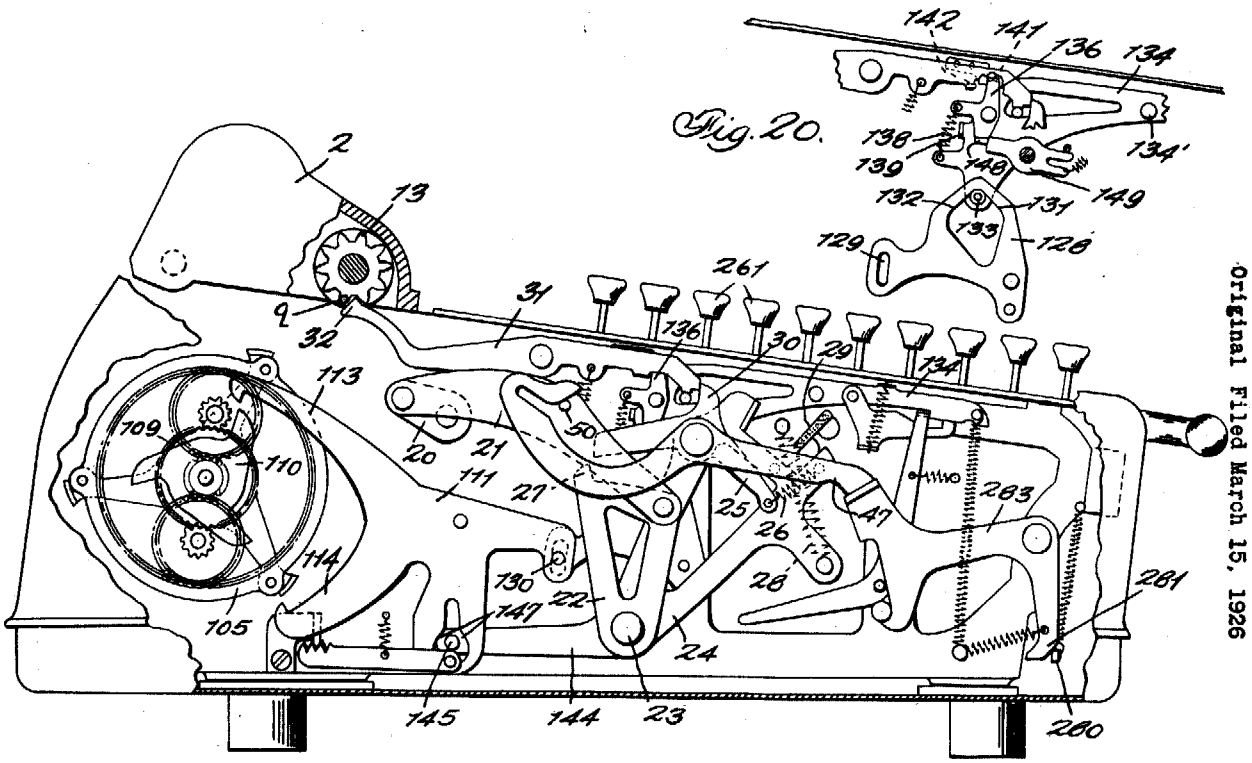
Inventor
Geo. C. Chase.
By E. W. Anderson Jr.
Attorney

MULTIPLIER MECHANISM FOR CALCULATING MACHINES

Original Filed March 15, 1926 15 Sheets-Sheet 13

Inventor

Geo. C. Chase

By E. W. Anderson Son.

Attorney

Oct. 22, 1929. G. C. CHASE Re. 17,466

MULTIPLIER MECHANISM FOR CALCULATING MACHINES

Original Filed March 15, 1926 15 Sheets-Sheet 14

Inventor

Geo C. Chase.

By E. W. Anderson Jr.

Attorney

Oct. 22, 1929. G. C. CHASE Re. 17,466

MULTIPLIER MECHANISM FOR CALCULATING MACHINES

Original Filed March 15, 1926 15 Sheets-Sheet 15

INVENTOR

Geo. C. Chase.

BY E. W. Anderson Son.

ATTORNEY

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

MULTIPLIER MECHANISM FOR CALCULATING MACHINES

Original No. 1,685,074, dated September 18, 1928, Serial No. 94,968, filed March 15, 1926. Application for reissue filed August 7, 1929. Serial No. 384,056.

This invention relates to means for accomplishing multiplication in calculating machines, such, for instance as the reversible cycle calculator disclosed in Patent No. 1,566,650, issued to George C. Chase, on December 22, 1925, entitled Operating means for calculators, being shown as applied to a machine constructed in accordance with the reissue patent to Baldwin, No. 13,841, as modified by the Patent No. 1,474,230, issued to E. F. Britten, Jr., November 13, 1923, and by the above-noted patent to Chase.

An object of the invention is to provide multiplier key mechanism, whereby the depression of a key will determine the number of times that an amount set up on the multiplicand keys will be added upon the numeral wheels; in combination with means for terminating an operation upon an overrun of the tens carrying mechanism.

A further object is to provide a bank of multiplier keys with locking devices, whereby the depression of one key of the bank will lock the other keys until the partial product determined by the depressed key is registered.

Another object is to provide means whereby the locked keys are automatically released and the depressed key restored to raised position when the registration determined by the depressed key has been completed; or, the registration having been completed, when the operator releases the depressed key.

Another object is the provision of a multiplier key mechanism in which the machine will be stopped at the end of a registration conforming to the numeral value of a depressed key even if the operator continues to hold the key depressed, and in which the key will be restored to raised position when it has been released by the operator and the operation has been completed.

The invention consists in the novel construction and combination of parts as set forth in the appended claims.

In the accompanying drawings illustrating the invention,—

Fig. 11 is a planular section on line 11—11 of Fig. 10, with the multiplier selecting rack shown in normal position.

Fig. 12 is a similar view, with parts in the position taken upon depression of the 5 key.

Fig. 13 is a similar view, with the 5 key depressed and the selecting rack advanced four spaces.

Fig. 14 is a detail section on line 14—14 of Fig. 10, showing a multiplier key and associated parts in normal position.

Fig. 15 is a similar view, with the multiplier key shown as depressed.

Fig. 18 is a detail front view of the locking bail and latch in released position.

Fig. 19 is a left hand side view of the machine with the casing broken away, showing the parts in normal position.

Fig. 20 is a detail side view of parts hidden in Fig. 19.

*Registering means. Figs. 1–9*

Figure 1:
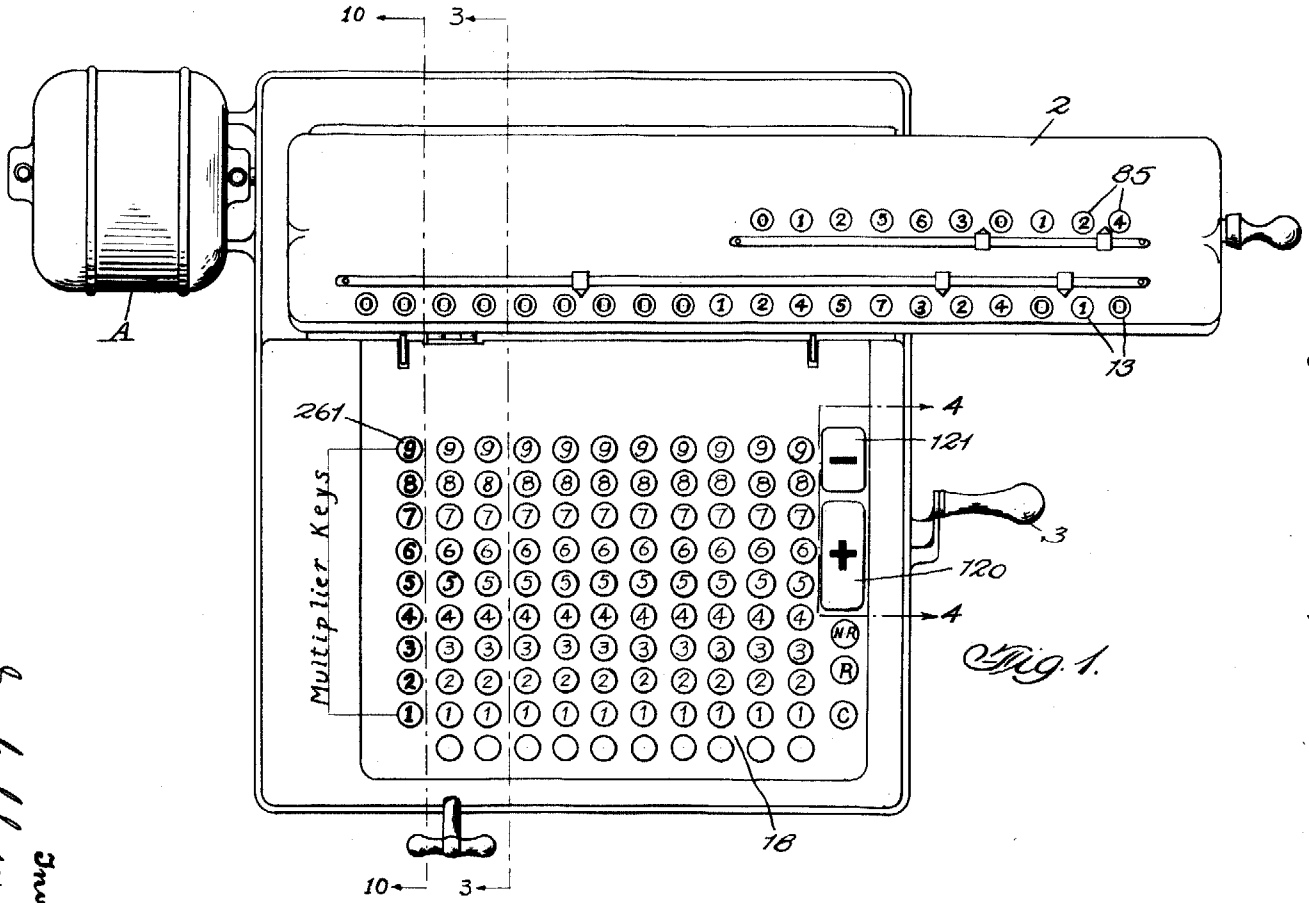
Figure 1 is a plan view of a calculating machine to which the invention is shown as applied.
Figure 2:
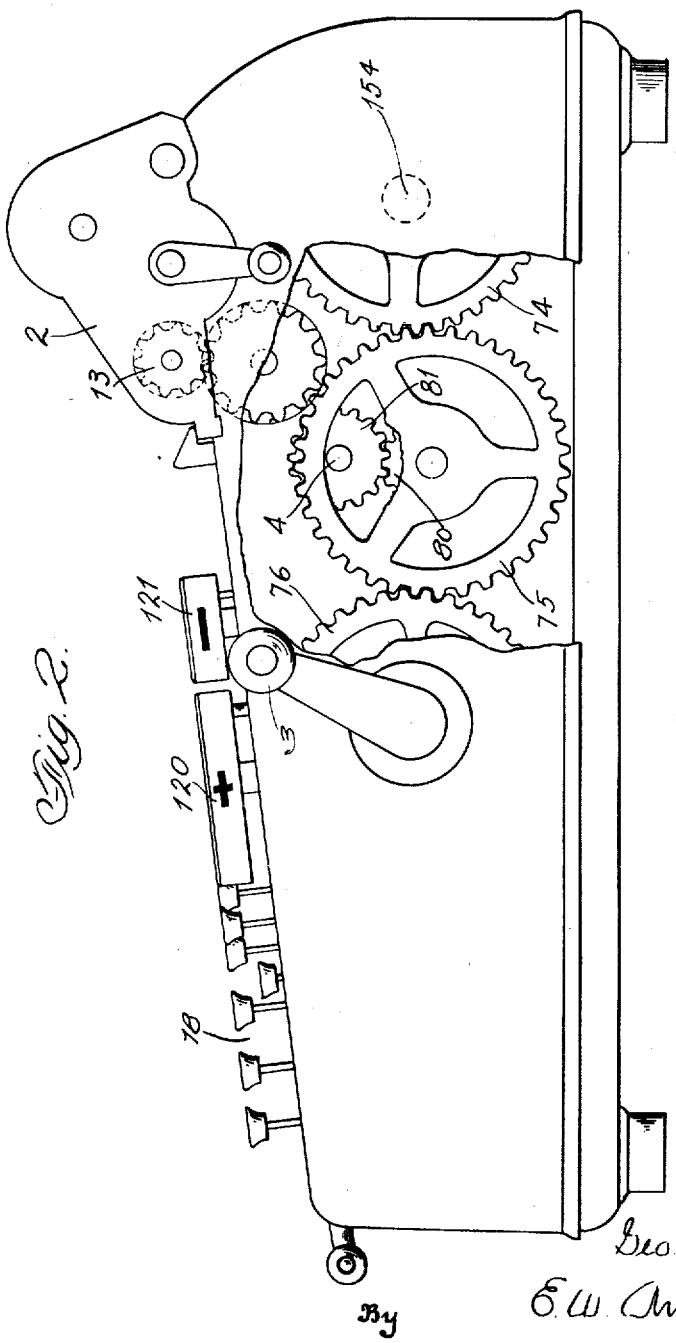
Figure 2 is a right hand side view of the same with the casing broken away.
Figure 3:
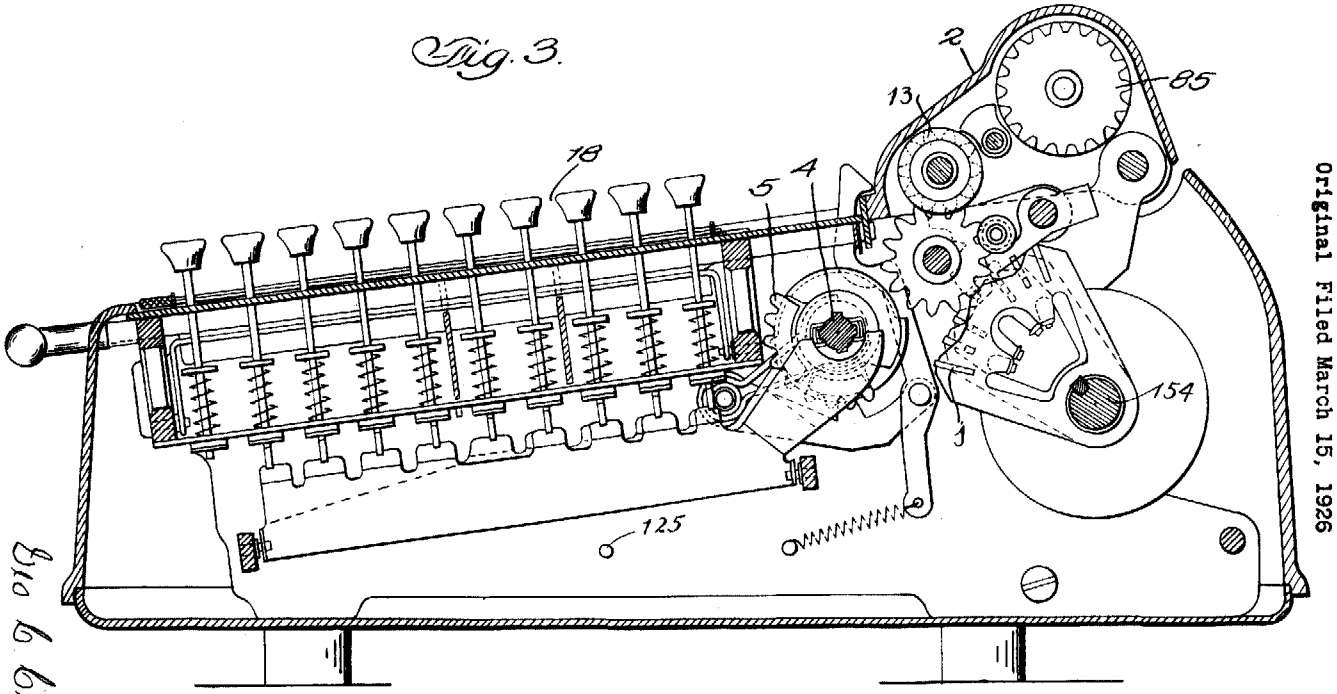
Figure 3 is a section on line 3—3 of Fig. 1.
Figure 4:
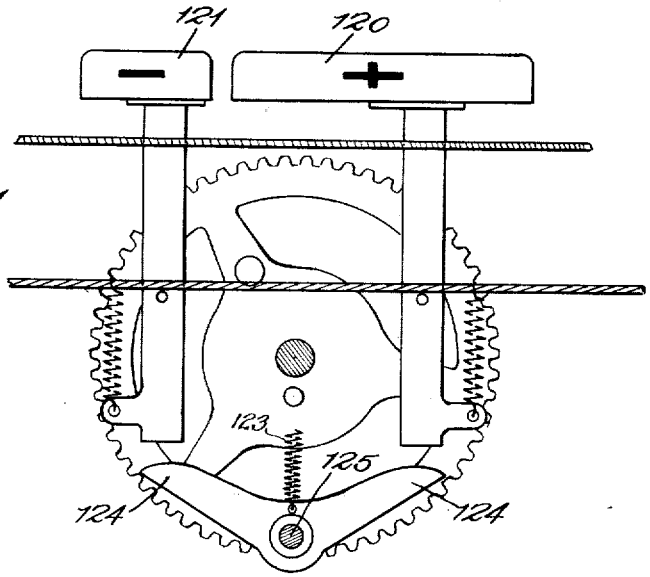
Fig. 4 is a detail section taken on line 4—4 of Fig. 1.

According to the present disclosure, and as more fully set forth in the Baldwin and Britten patents above referred to, amounts set up on the keyboard 18 and thereby upon the differential actuating gears 5 (Fig. 3) are registered upon numeral wheels 13 by the operation of differential gear shaft 4 and shaft 154 whereon the tens carrying members *j* are mounted, these shafts being connected by a train of 1-to-1 ratio gearing 74, 75, 80, 81, (Fig. 2).

Multiplier wheels 85 may be provided, as shown in these patents, or in accordance with other well known arrangements, but since this merely provides a checking up means in multiplication, it will not be necessary to describe the mechanism here. Means are also provided as in the above mentioned patents for transversely shifting the carriage 2 whereon the numeral wheels 13 and 85 are mounted, whereby multiplication and division may be performed in the well-known manner.

The motor driving means illustrated is substantially the same as that disclosed in the Chase Patent No. 1,566,650, wherein a motor A is in driving connection with a planetary gear mechanism, the gear members 105 and 109 of which normally rotate idly, but may be selectively arrested by means of a reversing clutch lever 111, to drive the third member of the differential, connected with carry shaft 154, forwardly or reversely, respectively.

Reversing clutch lever 111 is thrown from neutral into additive or subtractive clutch position by means of a transverse rock shaft 125 (Fig. 8), the direction in which this shaft is rocked to accomplish a given result being shown as opposite to that shown in the beforementioned Chase patent. For this reason the add key 120 and the subtract key 121 contact directly with the rock arms 124, 124, upon opposite sides of shaft 125, and setting lever 128 is pivoted to the frame eccentrically of shaft 125 and provided with a depending arm having a pin and slot engagement with a second rock arm 126 of shaft 125.

Figure 8:
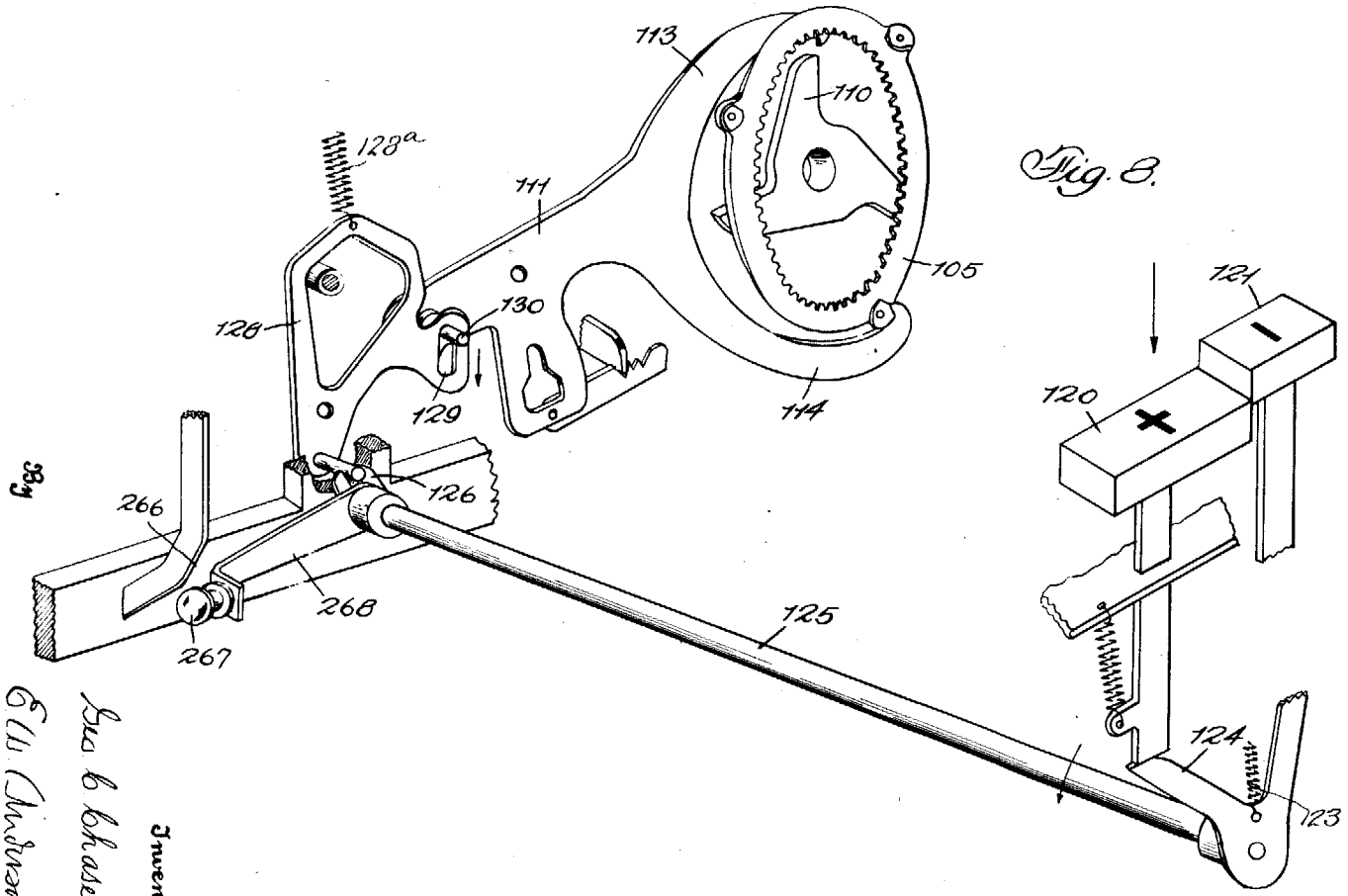
Fig. 8 is a perspective view of the starting mechanism, with the add key shown depressed.
Figure 9:
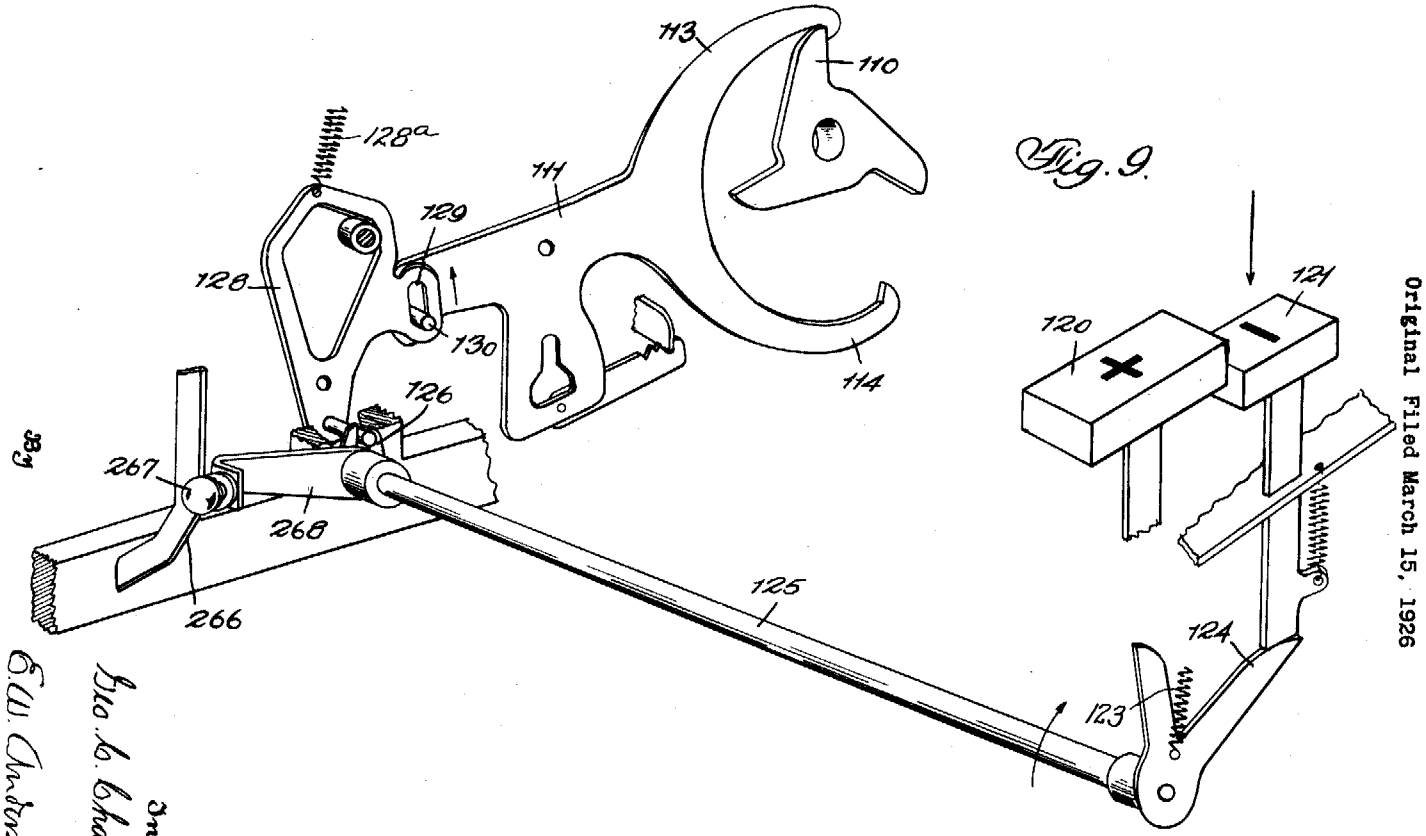
Fig. 9 is a similar view with the subtract key shown depressed.

The add key 120, as well as the multiplier key mechanism hereinafter described, will therefore act to rock shaft 125 in a counterclockwise direction, as viewed in Fig. 8, thereby rocking lever 128 in a clockwise direction, causing the wall of slot 129 of lever 128 to contact with pin 130 of lever 111 and engage the clutch tooth of arm 114 of the latter lever with gear 105, to cause additive rotation of the numeral wheel actuators. Depression of the subtract key 121 will rock the parts 124, 125, 126, 128, in the opposite direction. as shown in Fig. 9, causing the clutch tooth of arm 113 of lever 111 to engage the clutch member 110 of gear 109, to cause subtractive rotation of the numeral wheel actuators.

*Full cycle stopping means. Figs. 20–25*

Crank arm 20, upon shaft 4, has link connection 21 with rock lever 22. Arm 24 is pivoted at 23 and normally held in rearward position by spring 28, with a suitable lug thereof in contact with stop 29, and carries pivotal stop element 25, located in the plane of and normally held outside the path of movement of rock lever 22, against the tension of its spring 26 by the action of spring 28 and engagement of lug 30 of element 25 with the end of a lever 31. If the forward end of lever 31 is raised out of engagement with lug 30, element 25, assisted by its spring, will drop into position to engage the free end 27 of the rock lever 22 as the latter begins its next forward stroke. Arm 24 will now move as a unit with rock lever 22, a forward extension 144 of said arm engaging by means of a pin 145 thereof with a cam wall 147 of reversing clutch lever 111, to bring the latter to neutral or unclutched position.

Figure 5:
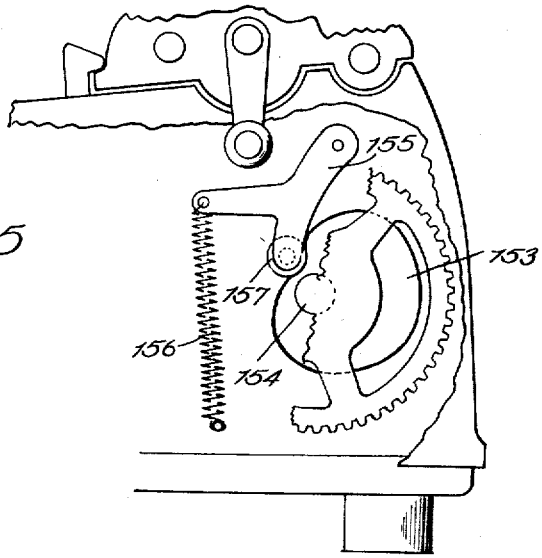
Fig. 5 is a detail side view with the casing broken away, showing the locator cam.
Figure 6:
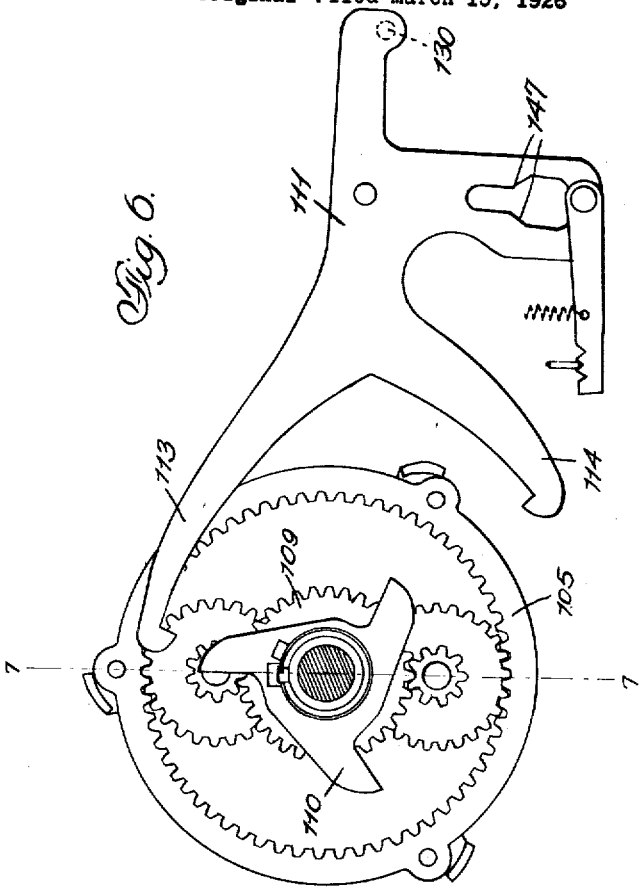
Fig. 6 is a detail side view of the clutching and reversing mechanism.
Figure 7:
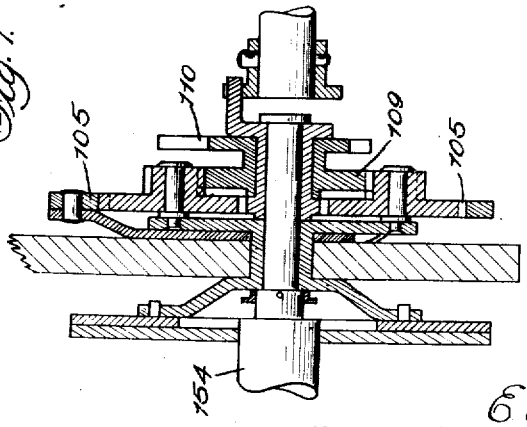
Fig. 7 is a detail section on the line 7—7 of Fig. 6.

The numeral wheel actuating means, thus freed from the action of the motor, will be brought to rest in full-cycle position as follows:

Following the action of arm 24 upon lever 111, continued movement of lever 22 and arm 24 will bring the latter into engagement with a fixed stop 29, whereby forward movement of the parts will be arrested beyond their full-cycle position, whether in additive or subtractive rotation. As soon as the forward end of lever 31 is allowed to drop into the path of movement of lug 30, the rebound of the actuating mechanism and the action of spring 28 will lift element 25 from engagement with lever 22 and leave the machine free for further operation, the actuators being located in full-cycle position by means of a cam 153 upon carry shaft 154, acted upon by lever 155, spring 156 and roller 157 (Fig. 5).

In addition, subtraction and multiplication, lever 31 is controlled as follows:

Setting lever 128 is provided with cam edges 131, 132, either of which may depress a roller 133 mounted upon the rear end of releasing lever 134, fulcrumed at 134′ to the framing. Upon the rear end of the releasing lever is pivotally mounted releasing pawl 136, impelled by spring 138 toward stopping lug 139 of said lever. Upon depression of the add or the subtract key or operation of the multiplier devices, lug 141 of pawl 136 will be depressed to a position lower than lug 142 of lever 31, whereupon spring 138 will move said pawl pivotally to bring lug 141 to position beneath lug 142 (see Fig. 21). Upon release of the key, releasing lever 134 will be moved by its spring to raise pawl 136, whereupon the contact of lug 141 with lug 142 will raise the forward end of lever 31 and trip stop element 25, to stop the machine at full-cycle position (see Fig. 22).

Arm 24 of the stop mechanism is provided at its upper end (shown as pivoted coaxially with element 25) with a laterally yieldable spring tooth 149, normally abutting against lug 148 of releasing pawl 136. Upon depression of pawl 136, consequent upon depression of the add, the subtract or a multiplier key, lug 148 will move downwardly past tooth 149 and spring 138, moving said pawl, will bring lug 148 beneath tooth 149 (see Fig. 21). Upon release of the key, pawl 136 will rise and its lug 148 will raise tooth 149 against the tension of its spring (see Fig. 22), in which position it will remain until arm 24 is carried forward, against stop 29 in the operation of the stopping means, when tooth 149 will be released and will resume a position in line with lug 148. In the rebound of the parts following contact of arm 24 with stop 29, the lug 30 of stop element 25 will pass below the forward end of lever 31, the latter being held in raised position by releasing pawl 136. Tooth 149 will now contact with lug 148 and move the releasing pawl to bring its lug 141 from beneath lug 142, whereupon the releasing pawl will be raised by the releasing lever spring to normal position, and lever 31 will fall and rest upon lug 30. Stop element 25 has thus been allowed to remain in contact with rock-lever 22, and link 21 moving through dead center position, the parts will be stopped a second time, should the rebound thereof be sufficient (see Fig. 25), following which stop element 25 will be restored to normal restrained positon by contact of lug 30 thereof with the end of lever 31, as in Fig. 20.

Division is accomplished upon this machine preferably by the method of repeated subtraction and the determination of a quotient figure may be made automatic by means of a special control, as follows:

The divisor set up on the keyboard being subtracted, by holding down subtract key 121, one more than the number of times it is contained in the corresponding portion of the dividend registered in wheels 13, a negative numeral wheel reading is obtained, the higher order numeral wheels 13 passing to a registration of nine as far to the left as carry over mechanism is provided. The carry pin $q$ (Fig. 19) of the numeral wheel which is in position to be acted upon by the extreme left-hand carry tooth $j$ (Fig. 3) will lie in such relation to lever 31 as to operate a cam end 32 of said lever as the wheel passes to 9, (Fig. 19) thereby raising the forward end of lever 31 and releasing stop element 25, to bring the machine to rest. In the machine illustrated, the stopping of the actuators will not be purely automatic, since if the operator continues to hold down the subtract key, the machine will immediately resume the operation. The return of the reversing clutch lever 111 to neutral position, resulting from the tripping of element 25, will, however, through parts 128, and 125, communicate a slight upward movement to subtract key 121, this movement serving as a signal to the operator to remove finger pressure from the key. The wheel 85 which is being operated at the time will now register one more than the true quotient, and a corrective additive operation is performed, by depressing add key 120. This will cause the carry teeth to return the wheels 13 reading nine to a zero registration, and the pin $q$ of the left hand wheel will again operate lever 31 and release the stop. whereupon the machine is brought to rest with the proper quotient figure upon wheel 85 and the proper remainder upon wheels 13. The use of the carriage 2 in continuing the division is well-known and needs no description.

*Multiplier mechanism. Figs. 10–17*

According to the embodiment of the invention illustrated herein, the following multiplier devices are provided, which cooperate with the mechanism, hereinbefore described, to provide for the automatic determination of product figures.

Figure 17:
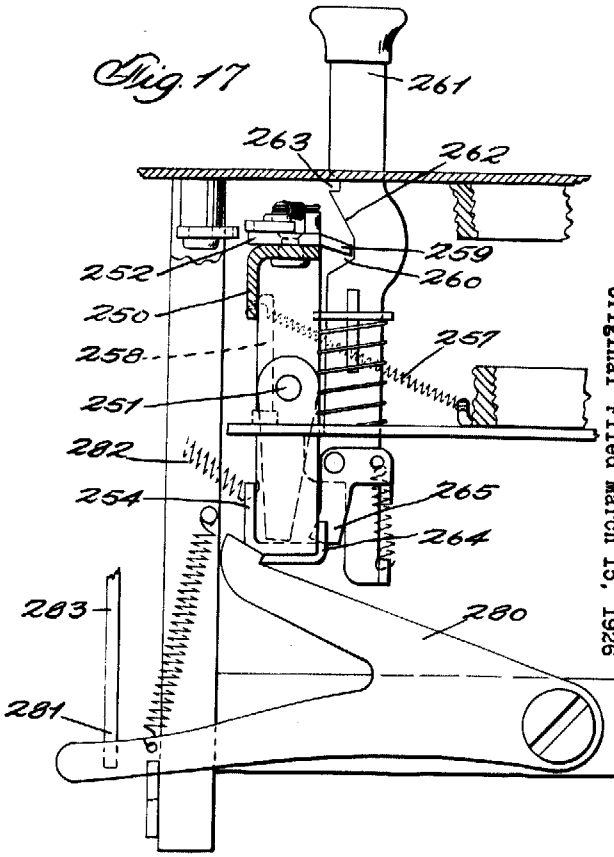
Fig. 17 is a detail front view of the multiplier selecting mechanism, showing the locking bail held in active position.
Figure 16:
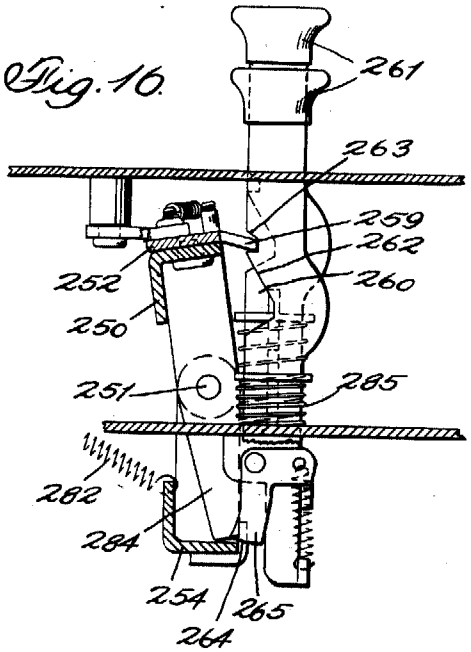
Fig. 16 is a similar view, showing the means whereby a depressed multiplier key must be released before another may be depressed.
Figure 21:
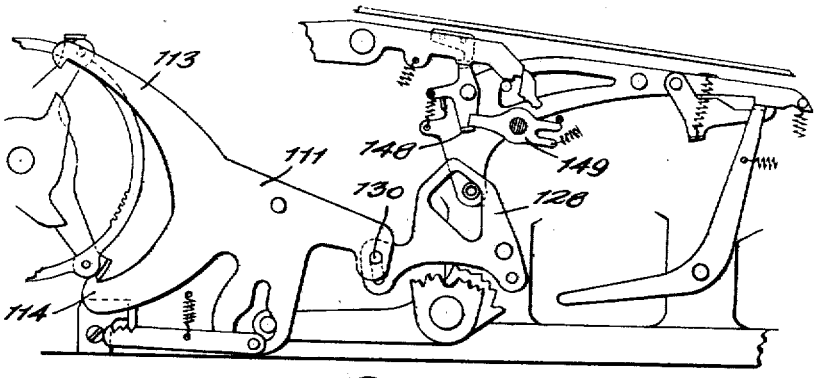
Fig. 21 is a detail side view of the stopping mechanism, with parts in position taken upon depression of the add, or partial depression of a multiplier key.
Figure 22:
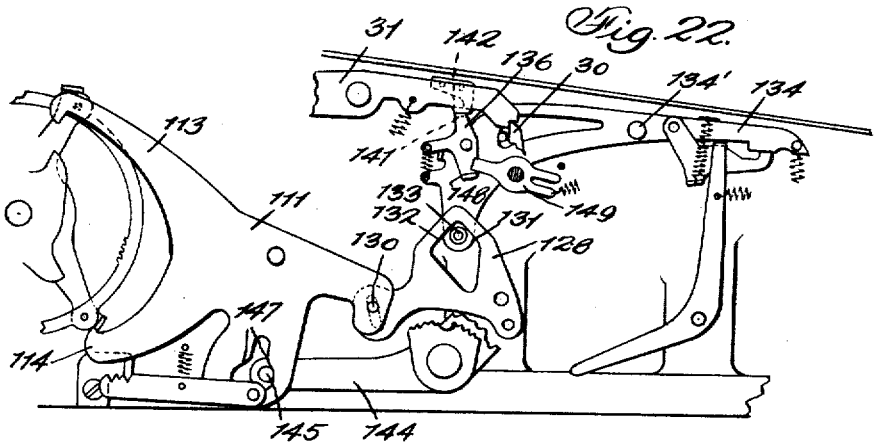
Fig. 22 is a similar view showing the parts in position taken upon release of the key and before the restoration of the clutch lever to neutral.
Figure 24:
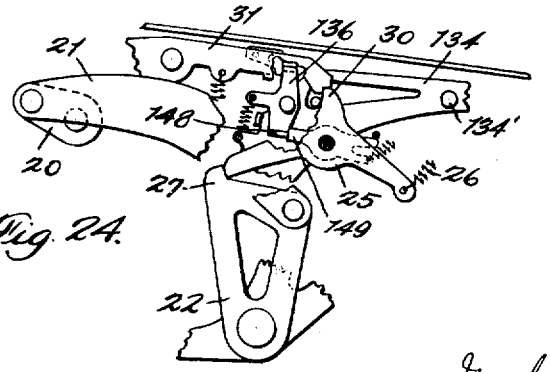
Fig. 24 is a similar view, with the parts shown as returned from the position of Fig. 23 to full cycle position.
Figure 25:
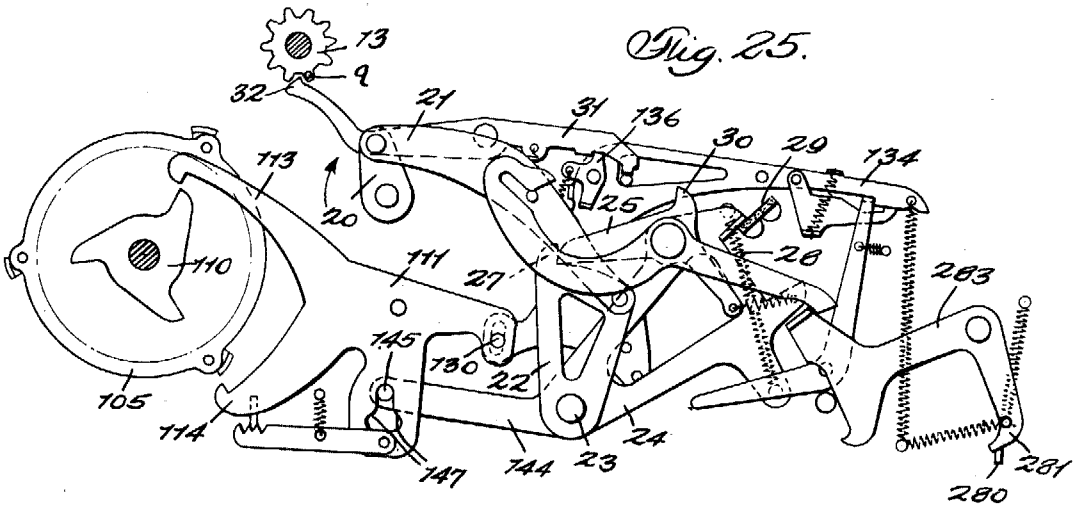
Fig. 25 is a similar view, with the parts shown as returned from the position in Fig. 24 to position with the rebound stopped and the multiplier locking bail released.
Figure 23:
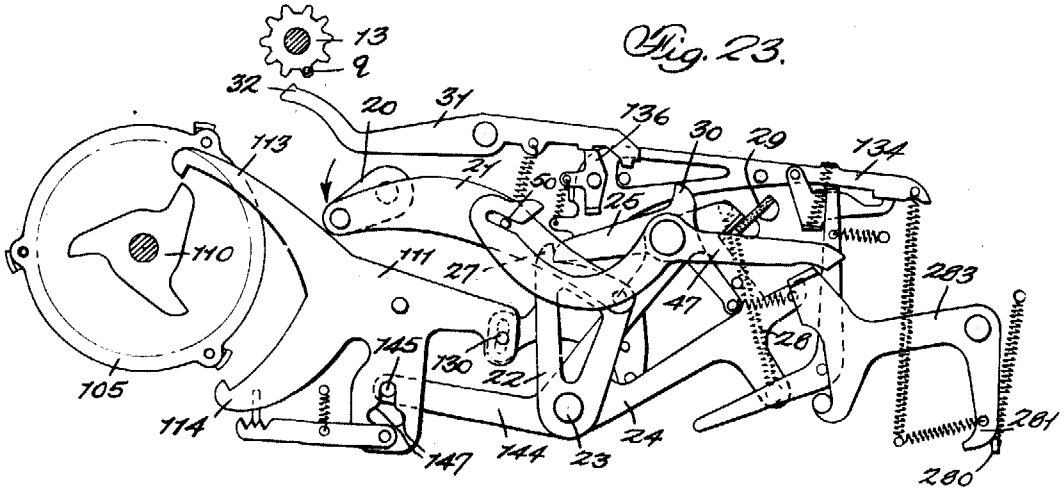
Fig. 23 is a similar view, with the parts in position as arrested at the end of an additive movement.

A bail 250, pivoted to the framing at 251, 251, carries a slide 252 secured thereon by a pin and slot connection, the slide being held in rearward position by means of a spring 253. The lower ends of bail 250 are extended past the pivots 251 at 284 below the lower keyboard plate, and contact with a locking bail 254, also depending from pivots 251, 251. An intermediately fulcrumed lever 255 engages a perforation 256 of bail 250, said lever forming in effect a depending extension of said bail. A spring 257 holds bail 250 and lever 255 normally in position with said bail engaging a stop 258 (Fig. 17). Slide 252 is provided with lateral spaced teeth 259, which in the normal position of the slide lie within notches 260 of the stems of the multiplier keys 261 (Fig. 14). The notch 260 of each multiplier key has an upper inclined wall or cam face 262, terminating at the lower edge of a shallow notch 263, the inner or stop wall of which is located in a plane of movement intersecting an intermediate point of said cam face. Upon depression of a multiplier key cam face 262 engaging the tooth 259 of slide 252, will rock bail 250 to the left until the tooth escapes from said edge, when the bail will assume an intermediate position where it will be held by engagement of tooth 259 with the stop wall of notch 263. Further depression of the key is prevented by engagement of a suitable stop, and return of the key to raised position by its spring is prevented by engagement of notch 263 with tooth 259 (Fig. 15). The free ends 284 of bail 250 abut against a flange 264 of locking bail 254, so that as bail 250 is rocked toward the left, the bail 254 will be rocked toward the right, where it will lie beneath the spring pawls 265, of the multiplier keys not depressed, whereby these keys will be locked in raised position.

This locking of the multiplier keys in raised position will prevent confusion of the registration by depression of a second key before completion of the registration determined by the first key. Such confusion might occur, in the illustrated embodiment of the invention, from an attempt to correct a multiplier figure; and also in certain practical methods of operation, wherein the operator may have occasion to depress multiplier keys in rapid succession, without any time lapse or intermediate operation of any kind. The confusion might occur in the registration of any successive multiplier figures, should the invention be applied to a machine equipped with an automatic shift for the numeral wheel carriage.

Figure 10:
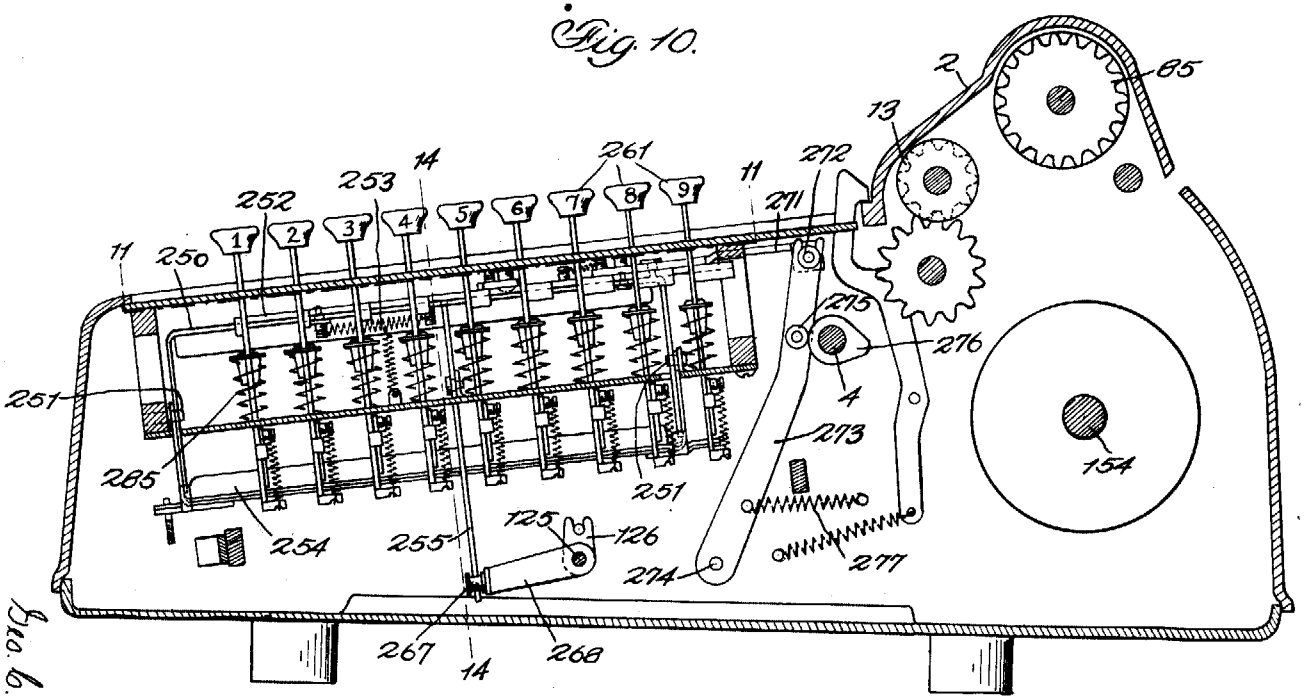
Fig. 10 is a section on line 10—10 of Fig. 1, showing the multiplier mechanism.
Figure 26:
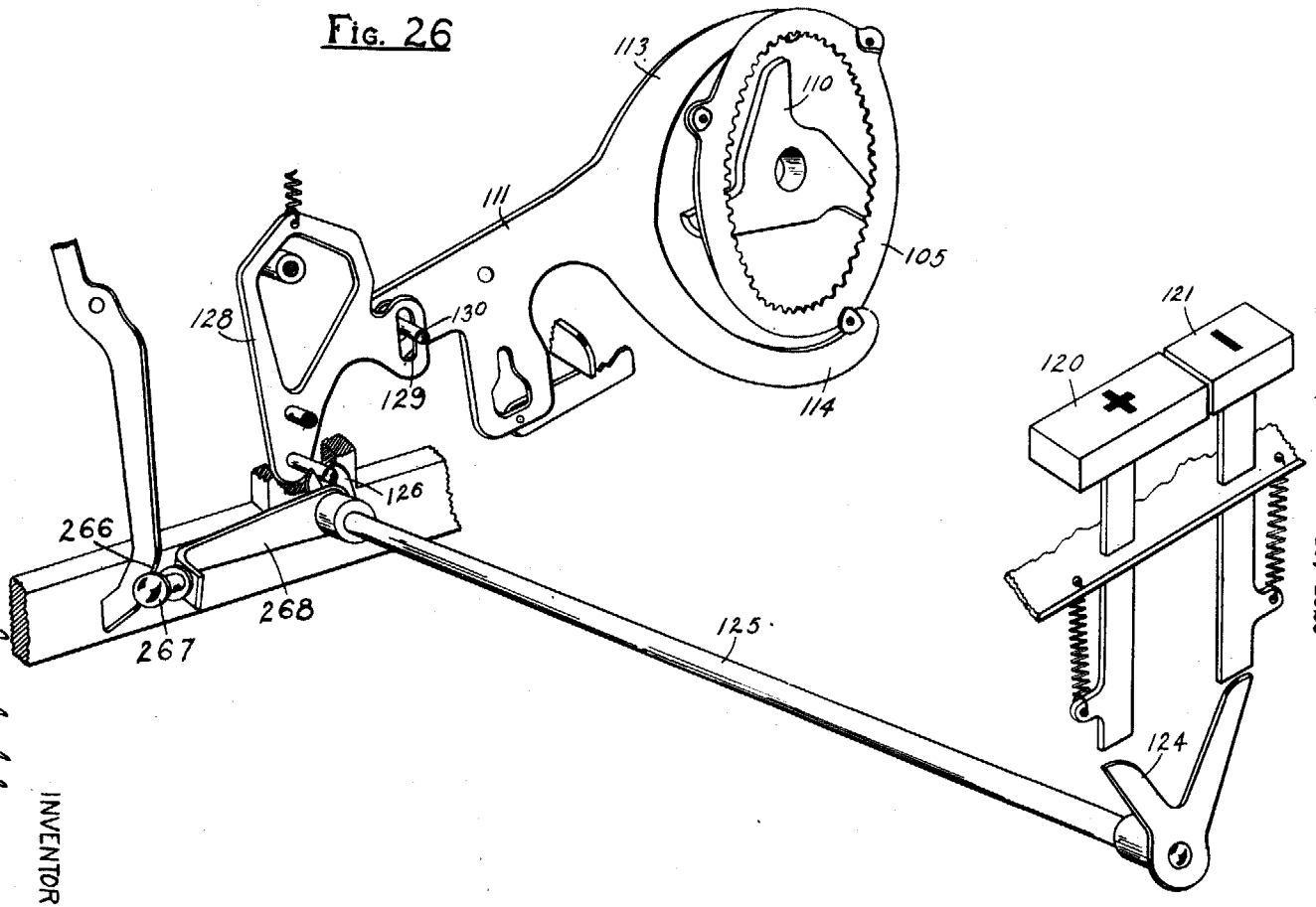
Fig. 26 is a perspective view of the starting mechanism, with the parts in position assumed with a multiplier key in full-depressed position.

Bail 250 and lever 255 having been rocked to extreme position by partial depression of the multiplier key, an inclined edge 266 of the lower arm of said lever will contact with the roller 267, mounted at the end of an arm 268 secured to rock shaft 125, and by depressing said roller will rock the shaft 125 in a counterclockwise direction as viewed in Fig. 10. This movement, as previously explained, will start the machine in rotation in an additive direction. While bail 250 is in its intermediate position, shaft 125, lever 128 and lever 134 will hold pawl 136 sufficiently depressed to avoid the tripping of trigger 31 (Figs. 20 and 26).

In order to stop the machine at the end of a number of cycles of operation determined by the multiplier key which has been depressed, the following mechanism is provided:

On slide 252 (Figs. 10–13) is mounted a pawl 269, which as bail 250 is rocked to the left will engage the rack teeth 270 formed in bar 271 slidably supported on the framing of the machine, and provided with a roller 272 engaged by the forked end of a lever 273 fulcrumed at 274 to the framing and bearing a roller 275 engaged by a cam 276 mounted on shaft 4. The parts are held rearwardly against cam 276 by means of a spring 277.

Thus, at each rotation of shaft 4 slide 252 will be advanced a distance corresponding to one tooth of the rack 270 and will be held in progressively advanced position by means of a spring pawl 278, pivoted to the framing, and engaged by rack teeth 279 of slide 252 when bail 250 is swung to the left upon depression of a multiplier key. In extreme left hand position of slide 252, pawls 269 and 278 yield slightly, and will remain in engagement with their rack teeth in the intermediate position of the bail and slide, when the tooth 259 of the latter enters the notch 263 of the key. The teeth 259 on slide 252 which, as stated, lock down the multiplier keys, vary in breadth, the tooth cooperating with the 1 key being adapted to be moved out of register with the keys upon forward movement of slide 252 one step; the tooth cooperating with the 2 key normally extending rearwardly of the key stem a sufficient distance to register therewith until slide 252 has been moved forwardly two steps, etc. progressively, until the tooth cooperating with the 9 key provides for registration until the slide has been moved nine steps. In Fig. 13 the slide 252 is shown as having been advanced four steps by four rotations of the actuating means of the machine, and, since the 5 key is depressed, the next rotation of the actuating means will release the key. Upon release of the key, bail 250 with slide 252 returns to normal position, releasing the pawls 269 and 278, and allowing slide 252 to return to its normal rearward position under the action of spring 253. The return of bail 250 to normal position also restores lever 255 to normal position, releasing roller 267 and shaft 125, whereby the actuating means will be stopped in the manner previously described.

It has been stated that upon return of shaft 125 to normal position upon release of the add, subtract or a multiplier key, the machine will continue in operation until the actuators reach full cycle position. Preferably, in the construction illustrated, cam 276 will advance slide 252 in the mid-cycle position of the numeral wheel actuating means, and for this reason it is desirable to prevent the depression of a multiplier key during the interval between the release of the key previously depressed and the completion of the stopping action. For this purpose a spring latch 280 (Figs. 17 and 18) is provided to hold the locking bail 254 in engagement with the pawls 265 of the keys. In normal operation, finger pressure upon the multiplier key being removed before the release of the key from slide tooth 259, the multiplier key spring 285 will restore the key to raised position, the pawl 265 of said key yielding as it is moved past locking bail 254 and returning to normal position above said bail, to lock the key against a second depression before the machine has been brought to rest. In effecting the stop, rock arm 24 is brought against stop 29 and the parts are allowed to rebound, as previously stated, until the crank connections 20, 21 having passed through dead center position, arm 24 is again brought into contact with stop 29. During the first or additive contact with the stop the push rod 47 pivoted to arm 24 will be held by pin 50 of link 21 out of contact with a lever 283. During the rebound, the parts moving in a subtractive direction, pin 50 will hold the push rod 47 in position of contact with lever 283, so that the latter will be actuated and a cam arm 281 thereof brought against latch 280 to move the same and release locking bail 254. The locking bail, being released, is returned to normal position by spring 282 and the multiplier keys are free to be depressed.

It is desirable that any operative impulse imparted to a multiplier key should become effective (provided pressure is continued until the key yields under the finger), even though an operator attempts to depress it while it is still locked by bail 254, the machine not having completed a previous multiplier operation. At this time pawl 265 acts like a rigid part of the multiplier key, pressure on the key pressing this pawl forcibly against lock bail 254, and unless these parts are properly related, pawl 265 would tend to bind the bail 254 and prevent it from releasing the key when latch 280 releases bail 254. If, however, the lower end of pawl 265 is provided with a slight camming angle, as shown in the drawings, pressure applied to the multiplier key will tend to force bail 254 toward its normal position, so that when latch 280 is released pawl 265 will cam over the bail 254 and the multiplier key will be free to initiate the intended multiplier operation.

Should a multiplier key be held in depressed position by the operator, bail 250 will return to its normal position at the proper time and the machine will be stopped in accordance with the value of the key. In such case slide 252 will be held in forward position by engagement of its projection 259 with the front face of the key stem. Upon manual release of the key slide 252 will return to normal position.

The multiplier mechanism is so designed that during the depression of a multiplier key the subtract key will be locked in raised position, and during the depression of the subtract key the multiplier keys will be locked in raised position. This is due in the first instance to the latching of bail 250 and lever 255 in the position shown in Fig. 15 upon the depression of a multiplier key, whereby the rise of roller 267 and the rocking of shaft 125 in a clockwise direction from the position shown in Fig. 26 will be prevented. On the other hand, depression of the subtract key (Fig. 9) will act to raise roller 267 to a position above the cam edge 266 of lever 255 and in the path of movement of said lever, whereby bail 250, slide 252 and keys 261 will be locked in the position shown in Fig. 14.

Should a transitional carry occur in multiplication, owing to accumulation upon numeral wheels 13, in excess of the capacity provided by the carry mechanism, the multiplier means are designed to permit reversing clutch lever 111 to be moved to neutral position, since the bail now stands in an intermediate position determined by the stop wall of notch 263 of the key. Shaft 125 and setting lever 128, therefore, stand in a partially retracted position, wherein pin 130 is allowed sufficient movement in slot 129 to provide for said movement of lever 111 to neutral. Under such conditions, the loss of carry will, of course, give an incorrect registration upon the numeral wheels, and it is desirable that the error be called to the attention of the operator. This is done by the stopping of the machine with the multiplier keys remaining locked, since the key locks are not released until the successive revolutions of cam 276 have advanced slide 252 sufficiently to bring the tooth thereof out of registration with the key notch.

The loss of carry being noted, it is necessary to continue the interrupted rotations until the multiplier keys are released. The tripping of trigger 31 by the numeral wheels will leave pawl 136 set to trip said trigger again upon release of the multiplier key. Depression of the add key will serve to move shaft 125 from the position illustrated in Fig. 26 to that of Fig. 8, whereupon the clutch will be re-engaged in additive position. Finger pressure being immediately removed from the add key, pawl 136 will be held depressed until the release of the multiplier key, whereupon the operation will be terminated. It is to be noted that upon interruption of the operation, the subtract key will remain ineffective, and that any key capable of re-engaging the clutch will act under these conditions to complete the multiplier operation.

Rotation of crank handle 3, attached to driving gear 76, would also serve to continue the multiplication and advance the slide. Upon the final cycle of predetermined operation, the multiplier keys will be released, this serving as a signal to the operator to bring the parts to rest with the crank handle in full-cycle position. The loss of carry having been noted, the operator may, if desired, correct the product reading by moving the carriage and registering the numeral 1 in the proper place.

I claim:

1. In a calculating machine having numeral wheels, actuating means therefor, driving means for said actuating means including a motor, and a clutch between said driving means and said actuating means; a plurality of multiplier keys of differing numerical value, control means including a member movable upon depression of any multiplier key and held thereby in position to effect engagement of the clutch and to determine additive registration upon said numeral wheels, and a key depressible to effect the clutch and to determine subtractive registration upon said numeral wheels, and cooperating means operable upon release of a key to release the clutch and bring the actuating means to rest, said movable member acting to lock the subtract key in raised position while a multiplier key is depressed and to lock the multiplier keys in raised position while the subtractive key is depressed.

2. In combination with a calculating machine having numeral wheels, actuating means therefor, stopping means for said actuating means, and means controlled by a given registering movement of the numeral wheels for operating said stopping means to terminate the registration; a plurality of multiplier keys of differing numerical value, and means operated upon depression of a multiplier key to effect registering movement of said actuating means, and normally operating to maintain registering action for a number of cycles ocrresponding to the value of the depressed key, and adapted upon said given movement of the numeral wheels to terminate the registration irrespective of said value.

3. The combination with a calculating machine having numeral wheels, actuating means therefor, stopping means for said actuating means, and means controlled by the numeral wheels for operating said stopping means to terminate a registration; a plurality of multiplier keys of differing numerical value, and means operated upon depression of a multiplier key to effect registering movement of said actuating means normally operating to maintain a registering action for a number of cycles corresponding to the value of the depressed key, and adapted, following interruption by said stopping means, under the control of the numeral wheels, to determine the completion of the interrupted registering action.

4. In combination with a calculating machine having numeral wheels, actuating means therefor, stopping means for said actuating means, and means controlled by a given registering movement of the numeral wheels for operating said stopping means to terminate a registration; a plurality of multiplier keys of differing numerical value, means operated upon depression of a multiplier key to effect registering movement of said actuating means and adapted upon said given movement of the numeral wheels to terminate the registration irrespective of said value, and means operable invariably to lock a multiplier key in depressed position until a number of cycles of registering operation have been effected corresponding to the value of said key.

5. In a calculating machine having numeral wheels, differentially settable multiplicand mechanism, a plurality of multiplier keys of differing numerical value, and means including a periodically advanced member for registering upon said numeral wheels products of values set in said multiplicand mechanism in accordance with the value of a depressed key; means operable upon depression of said key to lock the other multiplier keys in raised position, and means operable after said member has completed its periodical advance to automatically release the keys from the locking means.

6. In a calculating machine having numeral wheels, differentially settable multiplicand mechanism, a plurality of multiplier keys of differing numerical value, and means including a periodically advanced member for registering upon said numeral wheels products of values set in said multiplicand mechanism in accordance with the value of a depressed key, including cyclically operated actuators; means operable upon depression of said key to lock the other multiplier keys in raised position, and means operated by the actuators after said member has completed its periodical advance to release the keys from the locking means.

7. In a calculating machine having numeral wheels, differentially settable multiplicand mechanism, a plurality of multiplier keys of differing numerical value, and means for registering upon said numeral wheels products of values set in said multiplicand mechanism in accordance with the value of a depressed key, including cyclically operated actuators; means operable upon depression of said key to lock the other multiplier keys in raised position, and means for releasing the keys from the locking means upon an extra-cyclic movement of said actuators.

8. In a calculating machine having numeral wheels, differentially settable multiplicand mechanism, a plurality of multiplier keys of differing numerical value, and means for registering upon said numeral wheels products of values set in said multiplicand mechanism in accordance with the value of a depressed key; means operable upon depression of said key to lock the other multiplier keys in raised position, means for latching the locking means operable after the completion of said product registration to automatically release the latch.

9. In a calculating machine having numeral wheels, differentially settable multiplicand mechanism, a plurality of multiplier keys of differing numerical value, and means for registering upon said numeral wheels products of values set in said multiplicand mechanism in accordance with the value of a depressed key; means operable upon depression of said key to lock the other multiplier keys in raised postion, said locking means being adapted to release under finger pressure upon the keys; means for latching the locking means in active position; and means operable after the completion of said product registration to automatically release the latch.

10. In a calcluating machine having numeral wheels, differentially settable multiplicand mechanism, a plurality of multiplier keys of differing numerical value, and means for registering upon said numeral wheels products of values set in said multiplicand mechanism in accordance with the value of a depressed key; means operable upon depression of said key to lock the other multiplier keys in raised position and adapted to lock the operated key in raised position upon release thereof, and means for moving the locking means automatically to inactive position.

11. In a calculating machine having numeral wheels, differentially settable multiplicand mechanism, a plurality of multiplier keys of differing numerical value, and means for registering upon said numeral wheels products of values set in said multiplicand mechanism in accordance with the value of a depressed key, said means being adapted to lock said key in depressed position and to release the key upon determination of said product registration; means operable upon depression of said key to lock the other multiplier keys in raised position, and means operable after the completion of said product registration to release the keys automatically from the locking means.

12. In a calculating machine having numeral wheels, registering means including a motor and control devices selectively operable by a single manual stroke to effect positive or negative registration upon said numeral wheels; multiplier mechanism co-operating with said registering means and including control keys manually operable to effect positive registration upon said numeral wheels, and means adapted to prevent negative registering action of said control devices at any time while a multiplier key is in active position.

13. In combination with a calculating machine having numeral wheels, actuating means therefor, driving means for said actuating means including a motor, a clutch between said driving means and said actuating means, stopping means for said actuating means including unclutching devices, and means controlled by the numeral wheels for operating said stopping means; a plurality of multiplier keys of differing numerical value, and controlling means operated upon depression of a multiplier key to effect the clutch, normally operating to maintain a registering action upon said numeral wheels for a number of cycles corresponding to the value of the depressed key, and adapted upon re-engagement of said clutch following interruption by said stopping means under the control of the numeral wheels to complete the interrupted registering action automatically.

14. In combination with a calculating machine having numeral wheels, actuating means therefor, stopping means for said actuating means, and means controlled by the numeral wheels for operating said stopping means to terminate a registration; a plurality of multiplier keys of differing numerical value, means operated upon depression of a multiplier key to effect registering action of said actuating means including means settable upon depression of a multiplier key to operate said stopping means to terminate the registration upon completion of a number of cycles of operation corresponding to the value of said key, and adapted to remain set following interruption by said stopping means under the control of the numeral wheels, and means manipulable to effect automatic completion of the interrupted registering action under the control of the key-set means.

15. In a calculating machine having reversible numeral wheels, reversible actuating means therefor, driving means for said actuating means including a motor, a clutch between said driving means and said actuating means, operation keys, devices operable thereby to engage said clutch and to determine forward or reverse operation, stopping means for said actuating means including unclutching devices, and means controlled by the numeral wheels for operating said stopping means; a plurality of multiplier keys of differing numerical value, controlling means operated upon depression of a multiplier key to effect the clutch, normally operating to maintain a registering action for a number of cycles corresponding to the value of the depressed key, and adapted, following interruption by said stopping means, under the control of the numeral wheels, to hold the reverse operation key locked and to complete the interrupted operation upon depression of the forward direction operation key.

16. In a calculating machine having numeral wheels, actuating means therefor, driving means for said actuating means including a motor, a clutch between said driving means and said actuating means, and stopping means for said actuating means including unclutching devices; a plurality of multiplier keys of differing numerical value, controlling means including a member movable upon depression of a multiplier key from neutral through active to set position, and co-operating mechanism adapted in the active position of said member to engage the clutch and to place said stopping means under restraint and in the set position of said member to free the clutch from control and to maintain the stopping means under restraint, and mechanism operable to release said member from set position and thereby effect the stop at the conclusion of a number of cycles of operation corresponding to the value of said key.

17. In a calculating machine having numeral wheels, actuating means therefor, driving means for said actuating means including a motor, a clutch between said driving means and said actuating means, and stopping means for said actuating means including unclutching devices; a plurality of multiplier keys of differing numerical value, and provided each with a cam face and a stop wall located in a plane of movement intersecting an intermediate point of the cam face, controlling means including a bail and a member held thereby in contact with said key, and co-operating mechanism adapted through movement of said member by the cam face of the key to engage the clutch and during contact of said member with the stop wall of the key to hold said stopping means under restraint, and mechanism operable to release said member from the key and thereby effect the stop at the conclusion of a number of cycles of operation corresponding to the value of said key.

18. In a calculating machine having numeral wheels and actuating means therefor; a plurality of multiplier keys of differing numerical value, means operable upon depression of any multiplier key to effect registering movement of said actuating means, and co-operating mechanism for bringing the actuating means to rest, the key-operated mechanism including a member operable to lock the key in depressed position, to determine the duration of the registering operation with the key held manually depressed, and to release the key, the parts being adapted to prevent re-engagement of the lock while said key is held manually depressed.

19. In a calculating machine having numeral wheels and actuating means therefor; a plurality of multiplier keys of differing numerical value, means operable upon depression of any multiplier key to effect registering movement of said actuating means and to lock said key in depressed position, and cooperating mechanism adapted with the key held manually depressed to terminate the registration and release the key from said lock upon the completion of a number of cycles of operation corresponding to the value of said key, the parts being adapted to prevent re-engagement of the lock while said key is held manually depressed.

20. In a calculating machine having numeral wheels, actuating means therefor, driving means for said actuating means including a motor, and a clutch between said driving means and said actuating means; a plurality of multiplier keys of differing numerical value, control means including a member movable upon depression of any multiplier key and held thereby in position to effect the clutch, and a member progressively advanced in the operation of said actuating means and acting to release said movable member from the depressed multiplier key upon determination of a number of cycles of operation corresponding to the value of said depressed key, said control means acting to lock the multiplier key in depressed position and to release said key as it is released therefrom.

21. In a calculating machine having numeral wheels, actuating means therefor, driving means for said actuating means including a motor, and a clutch between said driving means and said actuating means; a plurality of multiplier keys of differing numerical value and having notched stems, control means including a bail member movable upon depression of any multiplier key and held thereby in position to effect the clutch, a slide mounted upon said bail member and provided with teeth, adapted to register with the notch of a depressed key, means for progressively advancing said slide in the operation of said actuating means to bring the tooth of said slide out of register with the notch to release the key and the bail member upon the determination of a number of cycles of operation corresponding to the value of said depressed key.

22. In a calculating machine having numeral wheels, actuating means therefor, driving means for said actuating means including a motor, and a clutch between said driving means and said actuating means; a plurality of multiplier keys of differing numerical value, controlling means operable to effect the clutch including a member set to operative position upon depression of any multiplier key, means for progressively advancing said member in the operation of said actuating means, said member being adapted to be released from the advancing means upon determination of a number of cycles of operation corresponding to the value of said depressed key, and means for restoring the control member from advanced to normal position, the parts being adapted to effect restoration of said member upon restoration of said depressed key to raised position.

In testimony whereof I affix my signature.

GEORGE C. CHASE.

CERTIFICATE OF CORRECTION.

Reissue No. 17,466. October 22, 1929.

GEORGE C. CHASE.

It is hereby certified that error appears in the printed specification of the above numbered patent requiring correction as follows: Page 6, line 122, claim 8, after the word "means" insert --in active position, and means--; and that the said Letters Patent should be read with this correction therein that the same may conform to the record of the case in the Patent Office.

Signed and sealed this 28th day of March, A. D. 1944.

Leslie Frazer (Seal) Acting Commissioner of Patents.